(12) United States Patent
Seip et al.

(10) Patent No.: US 10,166,420 B1
(45) Date of Patent: Jan. 1, 2019

(54) SENSOR RESERVOIR WITH PROBE TO MONITOR, MEASURE, AND CONTROL FIRE SPRINKLER AND OTHER SYSTEMS AND METHOD OF CONSTRUCTING AND USING THE SAME

(71) Applicant: JTJ Tech, LLC, Allentown, PA (US)

(72) Inventors: James N. Seip, Allentown, PA (US); Tyler Seip, Allentown, PA (US); Jonathan Epstein, Allentown, PA (US)

(73) Assignee: JTJ Tech, LLC, Allentown, PA (US)

( * ) Notice: Subject to any disclaimer, the term of this patent is extended or adjusted under 35 U.S.C. 154(b) by 0 days.

(21) Appl. No.: 16/100,505

(22) Filed: Aug. 10, 2018

Related U.S. Application Data

(60) Provisional application No. 62/546,544, filed on Aug. 16, 2017, provisional application No. 62/546,533, filed on Aug. 16, 2017.

(51) Int. Cl.
| | | |
|---|---|---|
| *A62C 37/50* | (2006.01) | |
| *A62C 35/68* | (2006.01) | |
| *G01K 13/00* | (2006.01) | |
| *A62C 35/60* | (2006.01) | |
| *A62C 37/36* | (2006.01) | |
| *A62C 35/58* | (2006.01) | |
| *A62C 35/64* | (2006.01) | |
| *A62C 35/62* | (2006.01) | |

(52) U.S. Cl.
CPC ............. *A62C 35/68* (2013.01); *A62C 35/58* (2013.01); *A62C 35/60* (2013.01); *A62C 35/62* (2013.01); *A62C 35/645* (2013.01); *A62C 37/04* (2013.01); *A62C 37/36* (2013.01); *A62C 37/50* (2013.01); *G01K 13/00* (2013.01)

(58) Field of Classification Search
CPC ......... A62C 35/60; A62C 35/62; A62C 35/58; A62C 35/68; A62C 35/645; A62C 37/50; A62C 37/04; A62C 37/36; G01K 13/00
USPC ........ 169/16, 17, 20–23, 56, 60, 61; 239/75, 239/128, 135
See application file for complete search history.

(56) References Cited

U.S. PATENT DOCUMENTS

| | | | | | |
|---|---|---|---|---|---|
| 4,023,164 | A | * | 5/1977 | Delaney ................ | G08B 17/04 169/23 |
| 4,901,061 | A | | 2/1990 | Twerdochlib | |

(Continued)

FOREIGN PATENT DOCUMENTS

WO   WO2012007753   1/2012

*Primary Examiner* — Steven J Ganey
(74) *Attorney, Agent, or Firm* — James R. McDaniel

(57) ABSTRACT

A sensor assembly having a sensor reservoir with probe for fire sprinkler and other systems to monitor and measure the internal characteristics of a pipe system wherein the sensor reservoir is directly connected to the pipe system, allowing the sensor reservoir to fill with the fluid contents of that system and to have a probe be in direct contact with the fluid contents of that system without altering the fluid flow dynamic within the piped system. The probe can transmit data to a controller and, based upon programmed criteria, interact with other devices, e.g., if the temperature probe reports a low temperature of the internal fluid characteristics, the controller can activate a heater linked to the controller so that pipes or sprinkler heads will be further resistant to freezing or other compromising conditions.

20 Claims, 11 Drawing Sheets

(56) References Cited

U.S. PATENT DOCUMENTS

| | | | |
|---|---|---|---|
| 6,960,321 B1 * | 11/2005 | Ludwig | A61L 2/07 |
| | | | 169/17 |
| 8,752,639 B2 | 6/2014 | Long | |
| 9,857,265 B2 | 1/2018 | DeVerse | |
| 9,958,337 B2 | 5/2018 | Soslae et al. | |
| 2002/0003042 A1 * | 1/2002 | Reilly | A62C 37/46 |
| | | | 169/17 |
| 2006/0272830 A1 | 12/2006 | Fima | |
| 2014/0332240 A1 * | 11/2014 | Kochelek | A62C 35/68 |
| | | | 169/17 |

* cited by examiner

SENSOR RESERVOIR WITH PROBE TO MONITOR, MEASURE, AND CONTROL FIRE SPRINKLER AND OTHER SYSTEMS AND METHOD OF CONSTRUCTING AND USING THE SAME

CROSS-REFERENCE TO RELATED APPLICATIONS

This application is a continuation of U.S. Patent Application 62/546,533, filed on Aug. 16, 2017 and U.S. Patent Application 62/546,544, filed on Aug. 16, 2017, which are continuations of U.S. Patent Application 62/376,853, filed on Aug. 18, 2016 and U.S. Patent Application 62/376,871, filed on Aug. 18, 2016, which are continuations of U.S. Patent Application 62/206,457, filed on Aug. 18, 2015 and U.S. Patent Application 62/206,444, filed on Aug. 18, 2015, which are continuations of U.S. Patent Application 62/038,776, filed on Aug. 18, 2014 and U.S. Patent Application 62/038,729, filed on Aug. 18, 2014, the disclosures of which are hereby incorporated by reference in their entirety to provide continuity of disclosure to the extent such disclosures are not inconsistent with the disclosure herein.

FIELD OF THE INVENTION

The present invention pertains to the field of the maintenance and monitoring of fluid/gas-filled piping systems (e.g., fire sprinkler or domestic water systems, etc.) installed both residentially and commercially. The system further pertains to the fields of monitoring temperature, moisture and other measurable characteristics within plumbing, sprinkler and other piping systems for applications in residential and commercial real estate, among others. To accomplish these goals, the system utilizes a sensor assembly having a sensor reservoir with a probe for internal sampling attached to a new or existing piping system. This reservoir is appropriately sized and installed in locations benefiting most from direct contact with the fluid/gas located within the piping system to monitor its internal characteristics in real time without interfering with or altering the fluid dynamics of the system.

BACKGROUND OF THE INVENTION

Fire sprinkler systems have been in use since the late 19th century. These systems play an integral role in protecting the lives of occupants in buildings and in reducing the damage to buildings from fire. To this end, sprinkler systems are regulated by applicable building codes. A structure's size, use, and occupancy expectations often mandate the installation of a sprinkler system.

It is well established that sprinkler systems are extremely effective life safety devices. However, the functionality of sprinkler systems can be compromised by cold weather, when pipes and sprinkler heads can freeze or burst, which can have fatal consequences by preventing the system from working properly.

Current regulations published by the National Fire Protection Association (or NFPA) mandate permanent heating of any and all spaces which house a sprinkler system or pipes such that they are protected against freezing. Building owners and managers currently conform to this regulation and protect their sprinkler systems against cold weather by heating sprinkler rooms using a heating solution that does not monitor the temperature of the fluid in the sprinkler system directly. This typically consists of an always-on room heater or a thermostat-controlled heater used to keep the air temperature in the room at a level more than sufficient to continually ensure the fluid in the sprinkler system is prevented from freezing. Even the most experienced building managers and owners still rely on an ineffective trial-and-error approach which can result in excessively high energy bills and waste.

These solutions and the current technology neither directly measure nor directly control their intended target: the temperature of the fluid (such as water) in the sprinkler system itself. This is a serious oversight and an unmet need in the fire safety industry, as well as others. Current solutions waste significant energy by blindly overheating a space in order to ensure the unobserved water temperature stays above freezing. Worse still, these solutions are not capable of detecting if the water is in danger of freezing (perhaps, for example, due to a heater malfunction). A solution that does not measure the fluid temperature directly can put life and property at risk. Take, for example, the overwhelmingly common case of a thermostat regulating the air temperature of a sprinkler riser room. Air temperature tends to change significantly faster than the fluid(s) contained within a piping system due to the difference in their respective specific heats. If someone were to open a door to such a room, allowing cold air to enter, the temperature of the air in the room would drop significantly faster than the temperature of the fluid in the sprinkler system. In response, the thermostat is likely to activate the heating system—since it is controlling against the air temperature—in order to maintain the air temperature set point, even though the temperature of the fluid in the sprinkler system likely remains largely unchanged. In this case, attempting to use air temperature as a proxy for the sprinkler fluid temperature would likely cause an unnecessary expenditure of energy and incur needless cost.

It is also known that the only practical instances where sensing instruments are used in connection with fire sprinkler systems are for internal flow detection (water moving through a pipe in the event of a deliberate or accidental sprinkler head discharge, leak, or fire event) and tamper detection (manual closing of a main flow valve). Through specialized monitoring, third-party alarm companies are alerted to binary changes in the system (flow/no flow; tamper/no tamper) so that they can subsequently notify the appropriate parties (e.g. alarm monitoring center, building management, building owners, fire department) with the notification sent from the system.

In particular, as shown in FIG. 1, a conventional piping system 500 includes a conventional pipe 502 that contains a fluid/gas 506 for use in a sprinkler system that is equipped with a fluid/gas condition sensor 504. As shown in FIG. 1, the probe 508 of sensor 504 is located within the flow of the fluid/gas 506 located within the pipe 502. The location of the probe 508 within the flow of the fluid/gas 506 can become problematic if a contaminant or other similar object within the fluid/gas contacts the probe 508 and breaks off or becomes obstructed by, probe 508. Therefore, it would be desirable to be able to measure the conditions of the fluid/gas without having the probe located within the flow of the fluid/gas 506 located within the pipe 502 and thereby disrupting the fluid flow dynamics within the pipe 502.

Consequently, sensors to detect water temperature or other measurable properties within the system which can more efficiently control associated heating elements and alert property owners of potential unsafe conditions before they occur is desirable. Despite the industry's need for such a solution, especially in light of the prevalence of increasingly severe weather conditions and modern system interconnectivity, none exists.

Furthermore, it is to be understood that the ability to determine the physical or chemical characteristics of fluid in a piped system, in real time, is vitally important in a wide range of industries. Indeed, for fire safety sprinkler industry applications, the importance of taking such measurements only increases with the size and complexity of the system. In short, current systems allow no accurate way to measure the real-time properties of fluid in within the system, potentially expending unnecessary energy and incurring associated costs while attempting to do so.

Finally, no universal and practical method or product exists for installing sensors into pipes without altering or impacting the system's fluid dynamics. There remains a significant need for an economical and practical process to monitor the real-time properties (temperature, moisture, pH, etc.) of the fluid within systems of pipes in diverse settings and environments.

Prior to the present invention, as set forth in general terms above and more specifically below, it is known to employ various types of monitoring and control process systems for fire sprinkler and other systems that utilize sensors. See for example, U.S. Pat. No. 4,901,061 by Twerdochlib, U.S. Pat. No. 8,752,639 by Long, U.S. Pat. No. 9,857,265 by DeVerse, U.S. Pat. No. 9,958,337 by Sosale et al., U.S. Patent Application 2006/0272830 by Fima, and PCT Application WO 2012/007753 by Towner et al. While these various monitoring and control process systems for fire sprinkler and other systems that utilize sensors may have been generally satisfactory, there is nevertheless a need for a differentiated real-time monitoring and control process systems for fire sprinkler and other systems utilizing sensors which include a sensor probes with an integrated reservoir directly connected to the piping system allowing the sensors to be in direct contact with the fluid within the pipe system so as to measure temperature and other measurable characteristics located within the piping system without altering the system's fluid dynamics.

It is the purpose of this invention to fulfill these and other needs in the prior art in a manner more apparent to the skilled artisan once given the following disclosure.

BRIEF SUMMARY OF THE INVENTION

A first aspect of the present invention is a system for monitoring and controlling temperature of a sprinkler system including a sprinkler system being a piped system, wherein a fluid/gas is located within the piped system such that the fluid/gas creates a fluid/gas flow dynamic within the piped system, a first fluid/gas sensor having a reservoir and a temperature probe located within the reservoir, wherein the first fluid/gas sensor is operatively connected to the piped system such that the first fluid/gas sensor is capable of detecting a temperature of the fluid/gas located within a particular section of the piped system and wherein the temperature probe is located within the reservoir such that the temperature probe does not disturb the fluid/gas flow dynamic within the plurality of pipes, a controller operatively connected to the first fluid/gas sensor for receiving the detected temperature of the fluid/gas located within a particular section of the piped system, and a heating device operatively connected to the controller, wherein the controller activates the heating device if the detected temperature of the fluid/gas located within a particular section of the piped system falls below a predetermined temperature.

In one embodiment of the first aspect of the present invention the first fluid/gas sensor further includes a drain/bleed valve operatively connected to the reservoir.

In another embodiment of the first aspect of the present invention the first fluid/gas sensor further includes a ball valve operatively connected to the reservoir.

In still another embodiment of the first aspect of the present invention the first fluid/gas sensor further includes an integrated system fitting operatively connected to the reservoir.

In yet another embodiment of the first aspect of the present invention the system further includes a second fluid/gas sensor operatively connected to the controller.

In a still further embodiment of the first aspect of the present invention the system further includes an offsite display system operatively connected to the controller, wherein the controller transmits information related to the detected temperature of the fluid/gas located within a particular section of the piped system to the offsite display system.

In a yet another embodiment of the first aspect of the present invention the system further includes an offsite fire monitoring control system operatively connected to the controller, wherein the controller transmits information related to the detected temperature of the fluid/gas located within a particular section of the piped system to an entity, such as an offsite monitoring control system.

In a still another embodiment of the first aspect of the present invention the system further includes an on-site alarm system operatively connected to the controller, wherein the controller transmits information related to the detected temperature of the fluid/gas located within a particular section of the piped system to the on-site alarm module.

In an even further embodiment of the first aspect of the present invention the controller further includes a battery backup, and a battery recharge device operatively connected to the battery backup.

A second aspect of the present invention is a system for monitoring and controlling temperature of a sprinkler system having a sensor with an integrated reservoir, including a sprinkler system being a piped system, wherein a fluid/gas is located within the piped system such that the fluid/gas creates a fluid/gas flow dynamic within the piped system, a first fluid/gas sensor having a reservoir and a temperature probe located within the reservoir, wherein the first fluid/gas sensor is operatively connected to the piped system such that the first fluid/gas sensor is capable of detecting a temperature of the fluid/gas located within a particular section of the piped system and wherein the temperature probe is located within the reservoir such that the temperature probe does not disturb the fluid/gas flow dynamic within the piped system, a second fluid/gas sensor operatively connected to the controller, a controller operatively connected to the first fluid/gas sensor and the second fluid/gas sensor for receiving the detected temperature and other desired characteristics of the fluid/gas located within a particular section of the piped system, and a heating device operatively connected to the controller, wherein the controller activates the heating device if the detected temperature of the fluid/gas located within a particular section of the piped system falls below a predetermined temperature.

In one embodiment of the second aspect of the present invention the first fluid/gas sensor further includes a drain/bleed valve operatively connected to the reservoir.

In another embodiment of the second aspect of the present invention the first fluid/gas sensor further includes a ball valve operatively connected to the reservoir.

In a further embodiment of the second aspect of the present invention the first fluid/gas sensor further includes an integrated system fitting operatively connected to the reservoir.

In still another embodiment of the second aspect of the present invention the system further includes an offsite display system operatively connected to the controller, wherein the controller transmits information related to the detected temperature of the fluid/gas located within a particular section of the piped system to the offsite display system.

In yet another embodiment of the second aspect of the present invention the system further includes an offsite fire monitoring control system operatively connected to the controller, wherein the controller transmits information related to the detected temperature of the fluid/gas located within a particular section of the piped system to the offsite fire monitoring control system.

In an even further embodiment of the second aspect of the present invention the system further includes an on-site alarm system operatively connected to the controller, wherein the controller transmits information related to the detected temperature of the fluid/gas located within a particular section of the piped system to the on-site alarm module.

In an even another embodiment of the second aspect of the present invention the controller further includes a battery backup, and a battery recharge device operatively connected to the battery backup.

A third aspect of the present invention is a method of monitoring and controlling temperature of a sprinkler system, including the steps of: providing a sprinkler system being a piped system, wherein a fluid/gas is located within the piped system such that the fluid/gas creates a fluid/gas flow dynamic within the piped system; providing a first fluid/gas sensor having a reservoir and a temperature probe located within the reservoir, wherein the first fluid/gas sensor is operatively connected to the piped system such that the first fluid/gas sensor is capable of detecting a temperature of the fluid/gas located within a particular section of the piped system and wherein the temperature probe is located within the reservoir such that the temperature probe does not alter or disturb the fluid/gas flow dynamic within the piped system; providing a controller operatively connected to the first fluid/gas sensor for receiving the detected temperature of the fluid/gas located within a particular section of the piped system; and providing a heating device operatively connected to the controller, wherein the controller activates the heating device if the detected temperature of the fluid/gas located within a particular section of the piped system falls below a predetermined temperature.

In another embodiment of the third aspect of the present invention the step of providing a first fluid/gas sensor further includes the step of providing a drain/bleed valve operatively connected to the reservoir.

In a further embodiment of the third aspect of the present invention the step of providing a controller further includes the step of providing an offsite display system operatively connected to the controller, wherein the controller transmits information related to the detected temperature of the fluid/gas located within a particular section of the piped system to the offsite display system.

The preferred monitoring and control process systems for fire sprinkler and other systems that utilize sensors having an integral reservoir, according to various embodiments of the present invention, offer the following advantages: ease of use; durability; improved fluid temperature measurement; improved energy savings; ability to measure the temperature of the fluid/gas in real time without interrupting the flow of the fluid/gas; ease of attachment of the sensor to a new or existing fluid/gas piping system; ability to measure other characteristics of the fluid/gas in the piping system in real time; and ease or removal/replacement of the sensor assembly. In fact, in many of the preferred embodiments, these advantages are optimized to an extent that is considerably higher than heretofore achieved in prior, known monitoring and control process systems for fire sprinkler and other systems.

BRIEF DESCRIPTION OF THE DRAWINGS

The above-mentioned features and steps of the invention and the manner of attaining them will become apparent, and the invention itself will be best understood by reference to the following description of the embodiments of the invention in conjunction with the accompanying drawings, wherein like characters represent like parts throughout the several views and in which.

DETAILED DESCRIPTION OF INVENTION, EMBODIMENTS AND OBJECTS OF THE INVENTION

Figure 1:
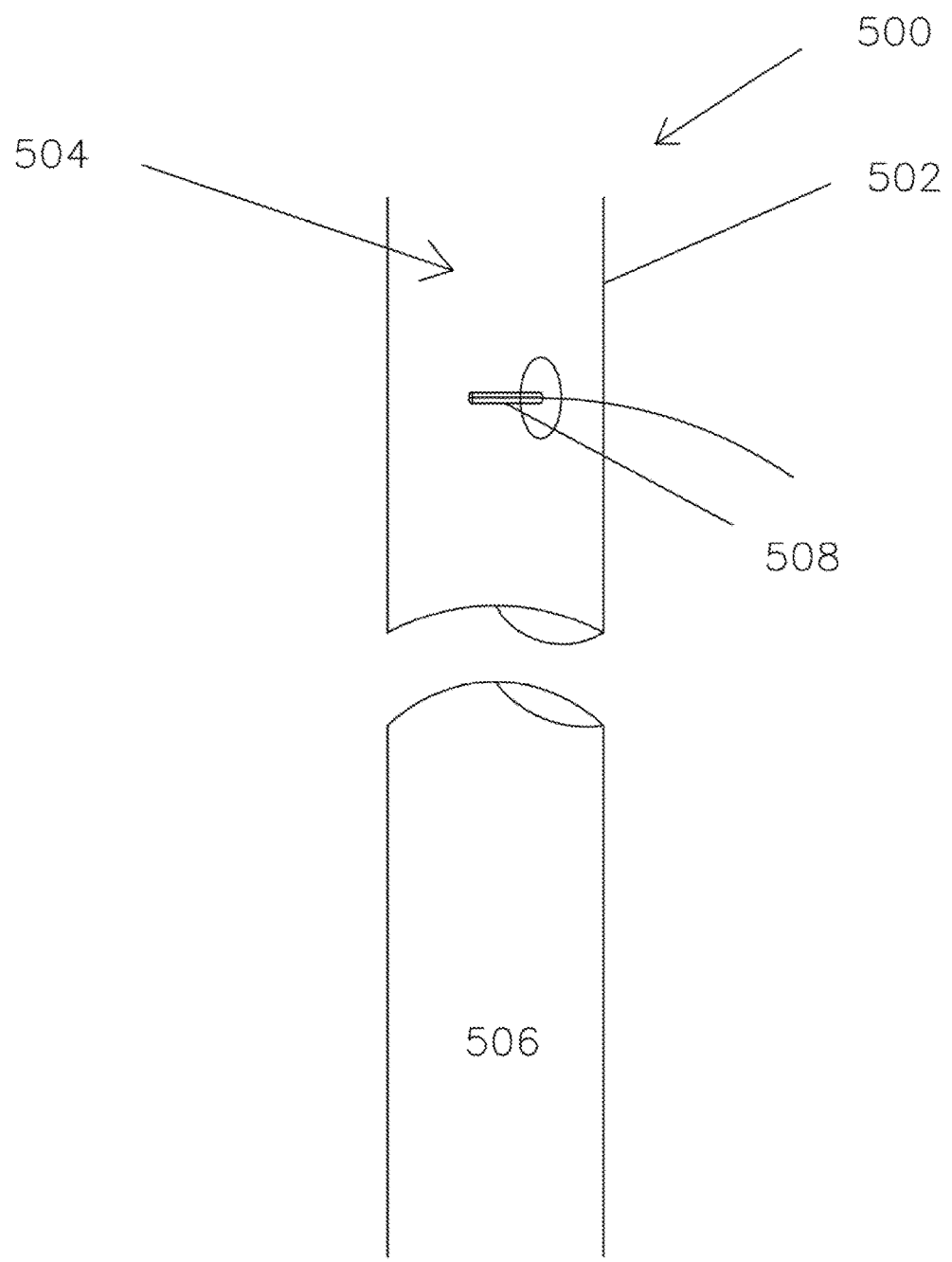
FIG. 1 is a schematic example of a sensor in a piped system, according to the prior art.
Figure 2:
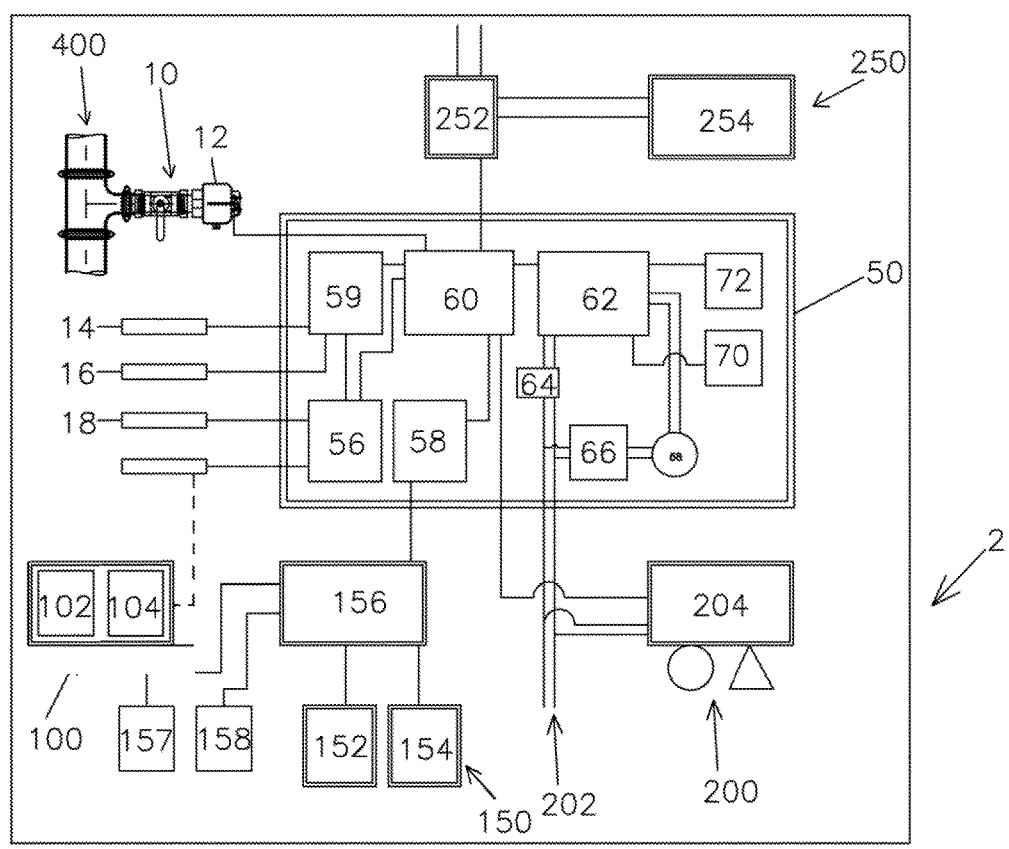
FIG. 2 is a white box implementation of a monitoring and control process system for fire sprinkler and other systems that utilize fluid/gas sensor assemblies having an integral reservoir, constructed according to the present invention.

In order to address the shortcomings of the prior known monitoring and control process systems for fire sprinkler and other systems that utilize sensors reference is made to FIG. 2 where there is illustrated monitoring and control process system 2 for fire sprinkler and other systems that utilize sensors. Monitoring and control process system 2 includes, in part, fluid/gas temperature measurement module 10, control module 50, offsite display module 100, offsite fire monitoring control module 150, on-site alarm module 200, and onsite heating system 250. The monitoring and control process system 2 utilizes sensors having an integrated reservoir and a probe that is attached to the piping system that allows the sensor to measure temperature and other characteristics of the fluid located within the piping system without the probe being located within the flow of the fluid located within the piping system such that the sensor does not disrupt the fluid flow dynamics within the piping system.

Fluid Temperature Measurement Module

With reference to FIG. 2, there is illustrated fluid temperature measurement module 10. Fluid temperature measurement module 10 includes, in part, sensor assembly 12 which will be described in greater detail later. Fluid temperature measurement module 10 may also include a variety of fluid/gas condition sensor assemblies such as a conventional sensor 14 for measuring an indoor air temperature, a conventional sensor 16 for measuring an outdoor temperature, and a sensor assembly 18 for measuring other desired conditions such as humidity, gas leakage or the like. It is to be understood that sensors 12, 14 and 16 are attached to a conventional data input device 59 in control module 50 in order to provide the temperature measurements to the control module 50, as will be explained in greater detail later. It is to be further understood that sensor assembly 18 could be a plurality of sensors that are used to measure a variety of desired conditions and temperatures. In any event, sensor(s) 12, 14, 16 and 18 is (are) attached to conventional data input devices 59 and 56 in control module 50 in order to provide the fluid/gas condition measurements of the fluid/gas located within piped system 400 to the control module 50, as will be explained in greater detail later. It is to be further understood that fluid/gas assemblies 12 and 18 are to be constructed in substantially the same manner.

Control Module

With reference to FIG. 2, there is illustrated control module 50. Control module 50 includes, in part, conventional data input device 54, conventional data input device 56, conventional data output device 58, control loop feedback device 60 such as a Proportional-Integral-Derivative (PID) controller, conventional interface 62 conventional transformer 64 (if required), conventional recharge device 66, conventional battery back-up 68, conventional data entry terminal 70 and conventional display 72.

Offsite Display Module

With reference to FIG. 2, there is illustrated offsite display module 100. Offsite display module 100 includes, in part, conventional display 102 and conventional data entry terminal 104. It is to be understood that offsite display module 100 can be used to provide data and other information about the fluid in system 2 to locations that are remote from the actual sprinkler system to which system 2 is attached.

Offsite Fire Monitoring Control Module

With reference to FIG. 2, there is illustrated offsite fire monitoring control module 150. Offsite fire monitoring control module 150 includes, in part, conventional fire department alert module 152, conventional property owner alert module 154, conventional fire system tamper 157, and fire system flow monitoring device 158 to dispatch notifications to a conventional offsite fire monitoring control/receiver 156 (typically, an alarm monitoring company or fire department).

On-Site Alarm Module

With reference to FIG. 2, there is illustrated on-site alarm module 200. On-site alarm module 200 includes, in part, conventional alternating current (AC) power source 202 and conventional audible/visual on-site fire alarm 204. It is to be understood that conventional alternating current (AC) power source 202 is used to provide power to the monitoring and control process system 2.

On-Site Heating System

With reference to FIG. 2, there is illustrated on-site heating system 250. On-site heating system 250 includes, in part, conventional alternating current (AC) solid-state relay 252 and conventional on-site heating device 254.

Operation of Monitoring and Control Process System

With respect to the operation of the monitoring and control process system 2, as shown in FIG. 2, the monitoring and control process system 2 includes a sensor assembly 12 attached to a new or existing sprinkler system which reads the internal water temperature (or other desired conditions of the fluid/gas) of the sprinkler riser without significantly affecting its fluid dynamics by utilizing a fluid temperature (or other) probe 318 (FIG. 4) in direct contact with the pipes' contents. The data from this probe is used as input through data input 54 to a controller 60 or other custom circuitry which controls the operation of a room or pipe heating element 254. It is to be understood that sensors 14, 16 and 18 can also be used to provide measurements of other conditions by transmitting the information to controller 60 through data input device 56. It is to be further understood that the controller 60 circuitry is configured or programmed to initialize a separate device to ensure the fluid temperature inside of the pipe remains above zero degrees Celsius (0° C.), thus preventing pipe freeze.

The data gathered in controller 60 can be used to notify a third-party alarm (fire department alert module 152), monitoring company or building management personnel (property owner alert module 154) of low temperatures inside the sprinkler system. The collected data is also used to control warning indicators and alarm outputs (audible/visual on-site fire alarm 204 in the on-site alarm module 200) and can be made available for real-time remote viewing over an Internet connection (offsite display module 100). In the event that the installed heating device 254 is not effectively heating the space (e.g., due to mechanical failure or limited heating capability), the present invention effects the triggering of the alarm output (offsite display module 100, fire department alert module 152, property owner alert module 154, and/or audible/visual on-site fire alarm 204) and the appropriate parties can be notified accordingly by various means.

This approach has significant advantages over current ad-hoc solutions. First, it is far more energy efficient than blindly heating a space using air temperature as the proxy for the temperature of the contents of the piped system by providing substantive and immediate information pertaining to the fluid inside the piped system. Second, it allows for automated temperature data logging and alarm activation in the event of a system failure or a pipe approaching freezing conditions or freezing. Third, this approach allows for this data to be viewed (display 102) in real-time by building management personnel in person or over remotely over the Internet.

Fluid Sensor Having an Integrated Reservoir

Figure 3:
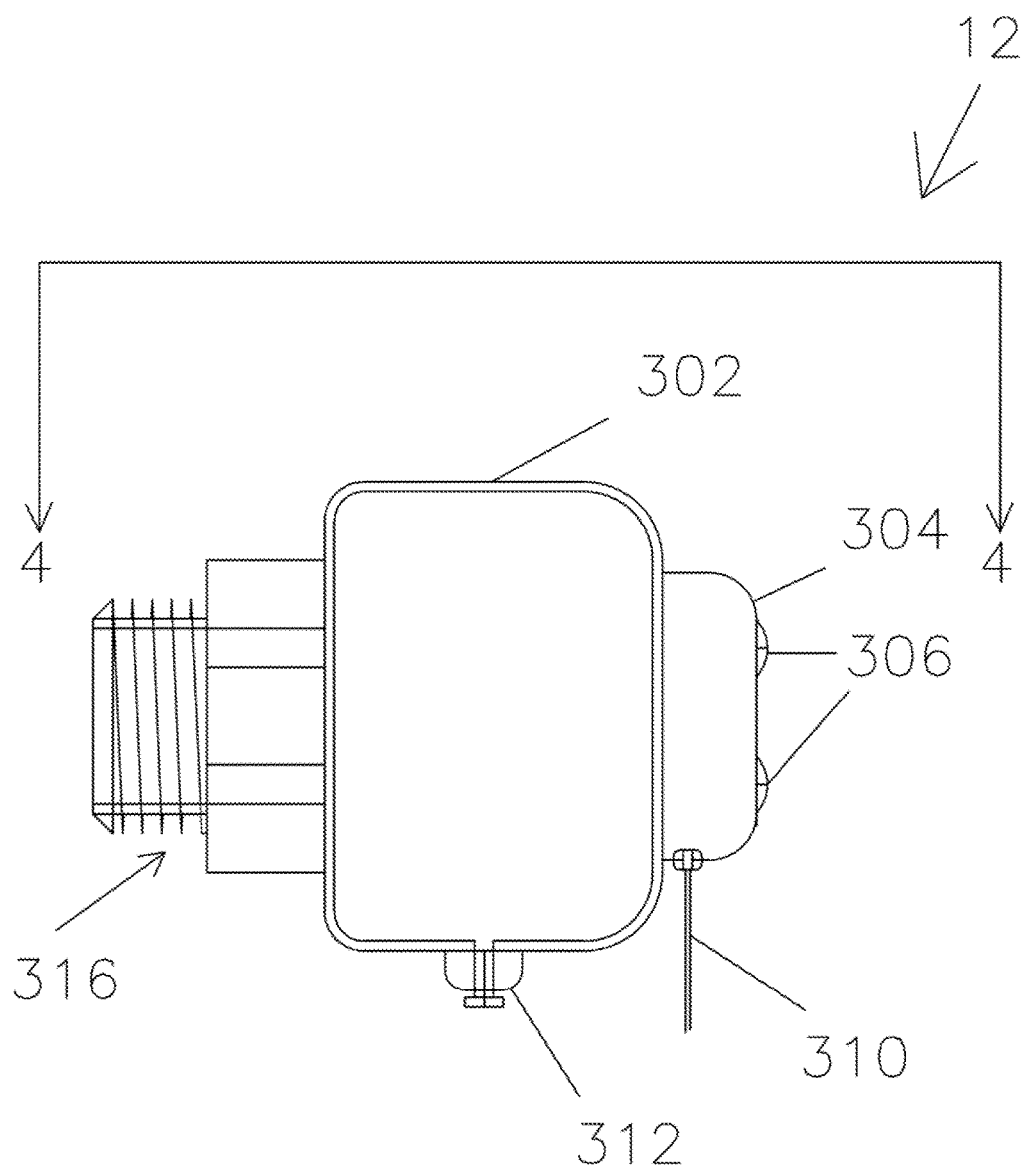
FIG. 3 is a schematic illustration of an integrated ball valve attached to a fluid/gas sensor assembly reservoir with probe, constructed according to the present invention.
Figure 4:
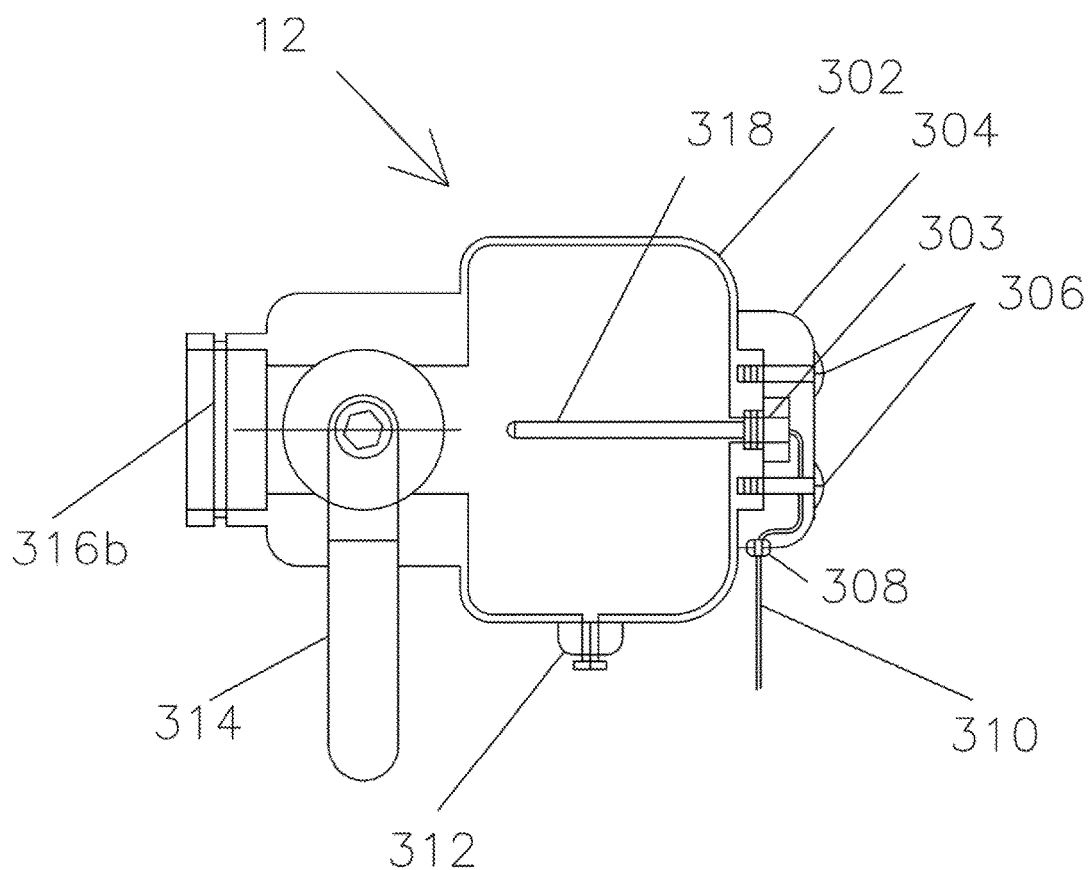
FIG. 4 is a cross-sectional view of the fluid/gas sensor assembly with an integrated reservoir, taken along lines 4-4 in FIG. 3, constructed according to the present invention.

With reference to FIGS. 3 and 4, there is illustrated fluid sensor reservoir 302, with probe 318. As shown in FIGS. 3 and 4, fluid sensor assembly 12 includes, in part, integrated reservoir 302, protective cap 304, conventional attachment fasteners 306, grommet 308, sensor wiring 310, conventional drain/bleed valve 312, conventional integrated ball valve 314, integrated system fitting 316 and 316b.

With respect to integrated sensor reservoir 302, protective cap 304 and integrated system fitting 316 and 316b these parts, preferably, are constructed of any suitable, industry standard, durable, high strength, corrosion or rust-resistant material such as metal or plastic.

Operation of Fluid Sensor Assembly

With respect to FIGS. 2-4, a preferred embodiment of the present invention comprises: a fluid probe 318 installed in a sensor reservoir 302, affixed to the fire sprinkler system that outputs fluid/gas condition data to a controller 60 which is controlling a solid-state relay 252. It is to be understood that the interface between the probe or probes 318 to the control module 50 may be either hard-wired or wireless. This relay 252 controls the conventional power supply to an external room heating device 254. The target temperature of the controller 60 is set by the building owner appropriately for the given climate, season or need. This might be as low as five degrees Celsius (5° C.) or as high as twenty-five degrees Celsius (25° C.), as mandated by the NFPA. By appropriately activating and deactivating the relay 252, the controller 60 ensures that the heating device 254 is used as efficiently as possible while still maintaining a safe condition of the fluid/gas in the sprinkler system 2, thereby preventing failure. The fluid/gas condition data is monitored and the data is available to be accessed remotely by one or more parties (offsite display module 100 and/or property owner alert module 154) through a conventional wired or wireless connection. The parameters of the internal system conditions programmed into controller 60 are able to be modified remotely using this connection (data entry terminal 104, for example). If a failure mode occurs, the system 2 will notify a monitoring company and the appropriate predetermined channels over this connection as well (fire department alert module 152 and/or property owner alert module 154). Failure modes may include and are not limited to rapid change of internal fluid/gas temperature within or an inability to maintain heat in the space due to heating device 254 malfunction or other conditions. In the event of power failure, the loss of connection will be interpreted as a system failure, thereby notifying the building management personnel of the incident immediately (property owner alert module 154). An optional battery backup system (battery recharge device 66 and battery backup 68) can then be used to activate both audible and visible notifications 204 of failure or trouble.

A unique aspect of the present invention is the ability of system 2 to interchange probes 318 to accurately measure specific physical or chemical characteristics of the fluid (including liquids and gasses) in real-time which is vitally important in a wide range of commercial settings. System 2 is capable of facilitating the detection and monitoring of some or all relevant conditions of the contents of a pipe or systems of pipes, including but not limited to, temperature, moisture, pH and consequently the state of progress of a chemical or physical reaction or consistency and compliance of pharmaceutical manufacturing practices. The present invention provides an economical and practical process and system to monitor the characteristics of fluids within the entire length of the systems of pipes with multiple and diverse commercial applications.

Another unique aspect of the present invention is the use of the self-contained sensor reservoir 302 that attaches to a fluid-filled-filled pipe system using various specially-designed and universal fittings such as integrated system fitting 316 and 316b. The sensor reservoir 302 includes a port 303 designed to allow for the insertion of a sensor probe 318 for the direct and real-time observation of any property measurable by the inserted probe.

It is to be understood that the present invention, a holding reservoir 302, which is offset from the main pipe (402 in FIG. 7) to house sensor probes 318 provides three innovative and distinct benefits. First, the flow (fluid dynamics) of the fluid within the pipe (402 in FIG. 7) is not impeded/disrupted or significantly altered in any way while still maintaining constant contact with the sensor probe 318 in the reservoir 302. Second, the reservoir architecture of the present invention allows the system 2 to be used on a wide variety of pipe sizes and locations to monitor in real time. Sensor reservoirs can be manufactured in sizes representative of the pipes to which they will be attached to give a representative sample size of the fluid characteristics. Additionally, the sensor reservoirs can be installed throughout the pipe system to measure different properties at different locations throughout that system. Pipes that otherwise could not fit the required sensor probes 318 can still be fitted with the reservoir 302, thereby permitting the use of the sensor. Third, the reservoir design allows for real-time sampling of pipe contents without evacuating the system 2. The reservoir 302 permits convenient accesses to the internal contents of the pipe—a drain/bleed valve or petcock drain 312 allows for the physical inspection of the fluid contained within, as well as routine examination, maintenance and repair or replacement of the sensors or sensor assembly.

A further unique aspect of the present invention is that the dimensions of reservoir 302 can be adjusted to accommodate the various industry-standard pipe diameters. This allows the reservoir to be designed not only to fit the pipe, but to yield accurate measurements given a particular realization of probe 318. For example, the dimensions of reservoir 302 can be adjusted such that its cross-sectional is representative of the cross-sectional area of the fluid flowing in a particular section of the piping system. This would allow an embedded sensor to perform temperature measurements of the liquid contained within that are representative of the larger system.

As discussed above, another embodiment of the present invention is to have the sensor reservoir 302, wherein the reservoir's control valve 314 is integrated into the unit itself, as depicted in FIG. 4. This objective may be accomplished using a conventional ball valve 314. The integrated system fitting 316b referenced in FIG. 4 is shown with an industry-standard fitting for a grooved pipe. It may also be of any other type, including a system comprising male or female standard pipe thread (SPT).

It is to be understood that the present invention is a one-piece, self-contained vessel that can be manufactured from a variety of industry-standard materials and allows for collection of fluid/gas from the main piping system and allows for the placement of one or more sensor assemblies 12 within it. The invention, an example of which is in FIG. 4, is capable of monitoring the properties (temperature, pH, moisture, etc.) of the fluid/gas within a system of pipes in diverse settings and environments. The sensor assembly 12 is also fitted with a drain/bleed valve 312 which serves two functions. First, drain/bleed valve 312 allows for air to be "bled" out of the reservoir 302 as reservoir 302 fills with the fluid/gas from the rest of the piping system, which ensures that the reservoir's sensor probe 318 is making complete contact with the fluid/gas in the system 2. Additionally, this drain/bleed valve 312 allows for a release of any internal pressure from the reservoir 302 in the event that sensor assembly 12 needs to be removed from the piping system 400.

With respect to the protective cap 304 and attachment screws 306, these are designed to protect the wiring 310 for the sensor or sensors 318 and also to protect their attachment point or points to the reservoir 302. It is to be understood that the protective cap 304 is easily removed for access and maintenance.

The grommet 308 isolates the sensor or sensors' wiring 310 from the protective cap 304 and may be omitted, depending on the sensor 318 and the installation of the sensor reservoir 302. Preferably, grommet 308 is constructed of any suitable polymeric material such as rubber.

Figure 5:
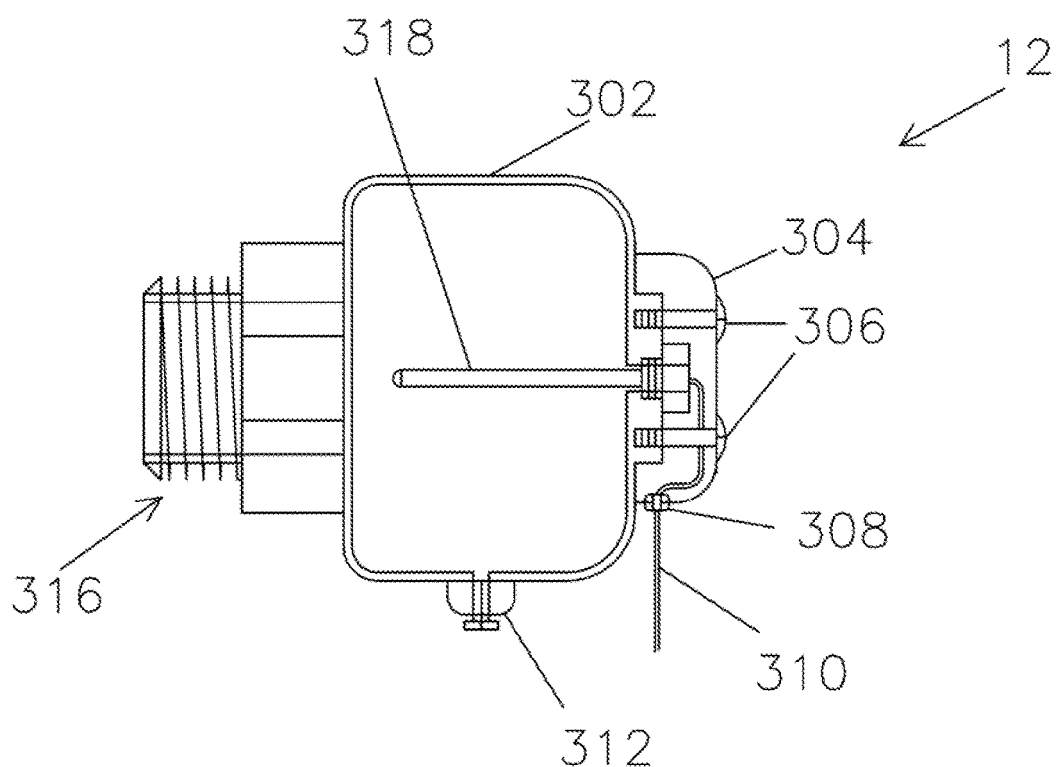
FIG. 5 is a cross-sectional view of the fluid/gas sensor assembly reservoir with probe without an integrated ball valve and employing male Standard Pipe Thread (SPT) fittings, constructed according to the present invention.
Figure 6:
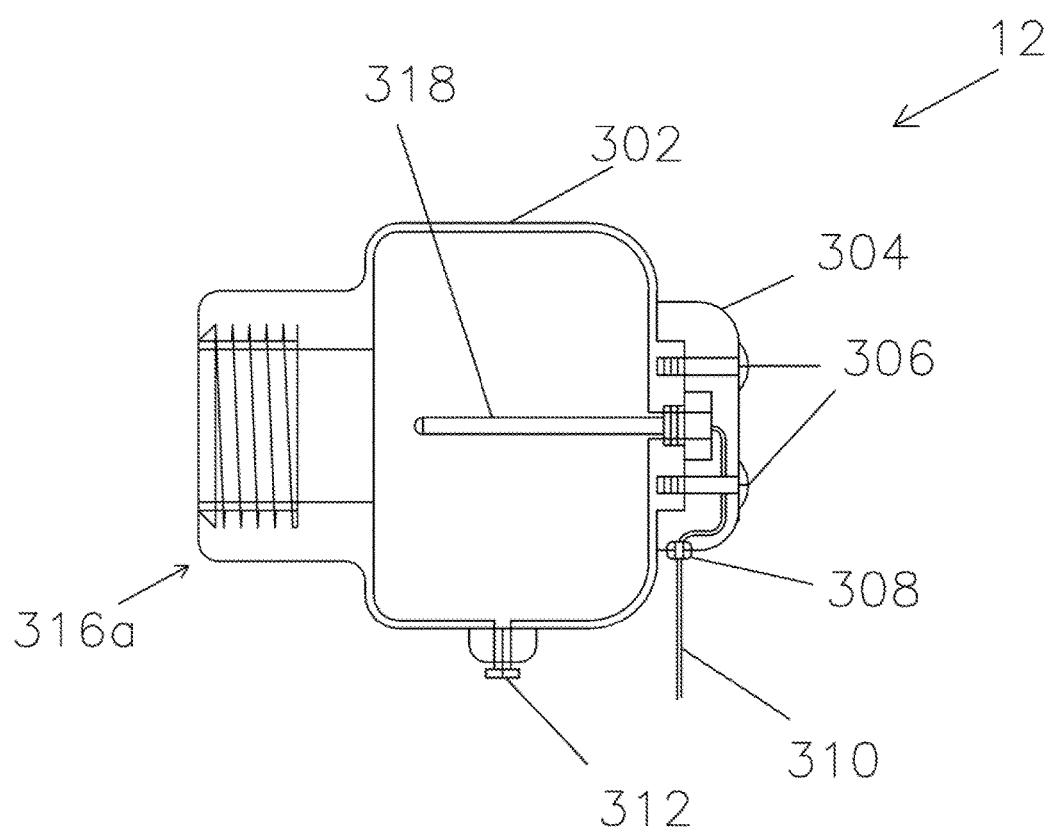
FIG. 6 is a cross-sectional view of the fluid/gas sensor assembly reservoir with probe without an integrated ball valve and employing female Standard Pipe Thread (SPT) fittings, constructed according to the present invention.

With respect to FIGS. 5 and 6, the present invention can also be designed, constructed and utilized with a reservoir 302 which is independent from a control valve 314, which may be necessary or helpful for some applications, settings and uses. FIGS. 5 and 6 show two cross-sectional drawings of non-integrated sensor reservoirs 302. The fitting for the present invention, as embodied in FIGS. 5 and 6, is shown with an industry-standard fitting for a standard pipe thread (SPT)—male threaded fitting 316 (FIG. 5) and female threaded fitting 316a (FIG. 6). This objective may be accomplished by various means, including, but not limited to, grooved pipe fittings, metric and other pipe thread standards. There are many options, variations and combinations available for industry-standard fittings to affix the sensor assembly 12 to a piping system depending upon the type of piping system, the industry, and other conditions.

Figure 7:
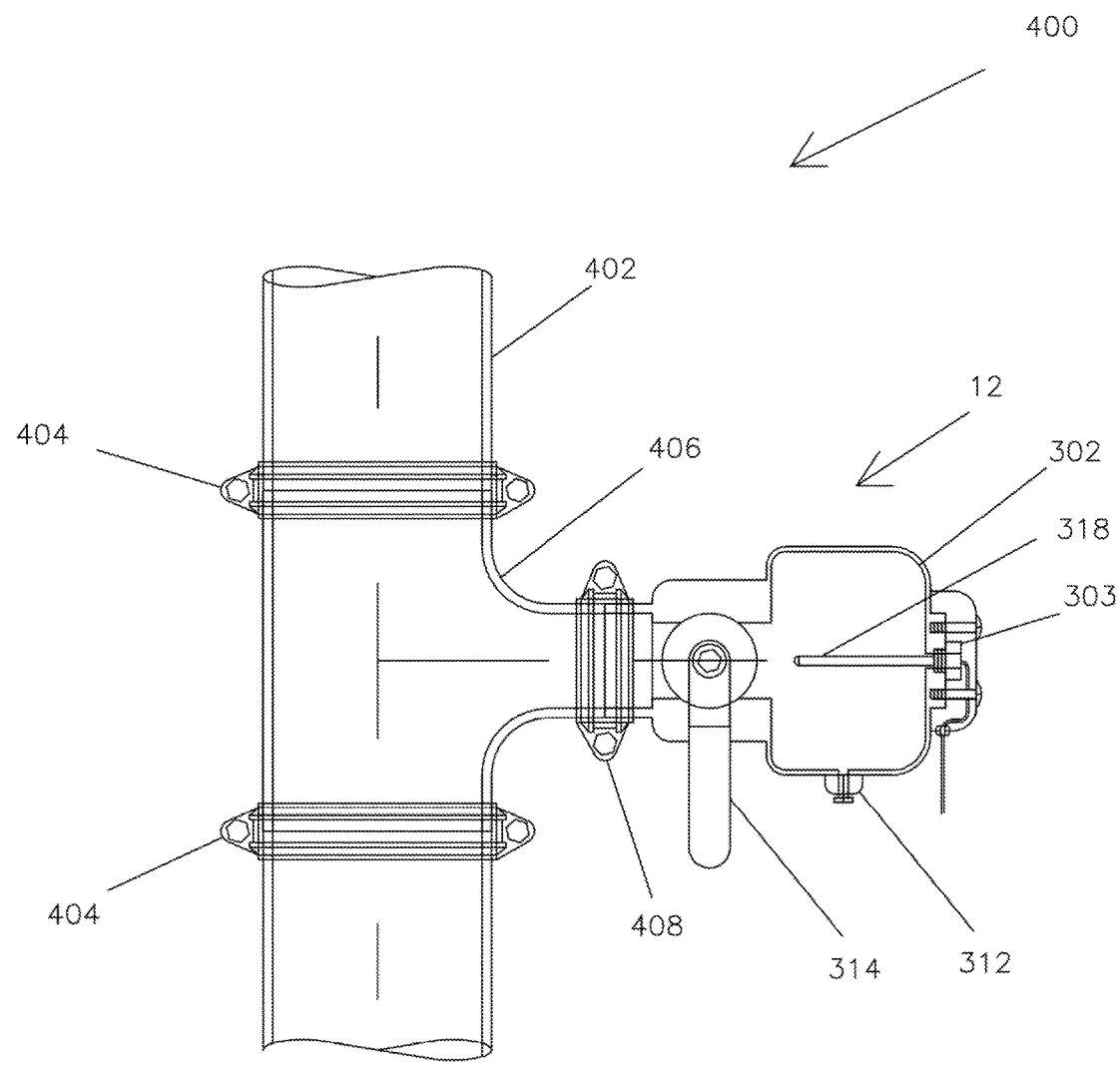
FIG. 7 is a side view of the fluid/gas sensor assembly reservoir with probe and integrated ball valve being attached to a tee fitting in a fluid/gas filled piped system, according to the present invention.

With respect to FIG. 7, there is illustrated the fluid/gas sensor assembly 12 sensor having an integrated reservoir 302 being attached to a conventional fluid pipe system 400. In particular, the pipe system includes, in part, conventional pipe 402, conventional pipe tee fitting 406 and conventional pipe/sensor coupling 404 and 408. It is to be understood that fluid pipe system 400 can be modified to extend the pipe system by incorporating a tee fitting 406 conventionally by using coupling devices 404 and 408.

Figure 8:
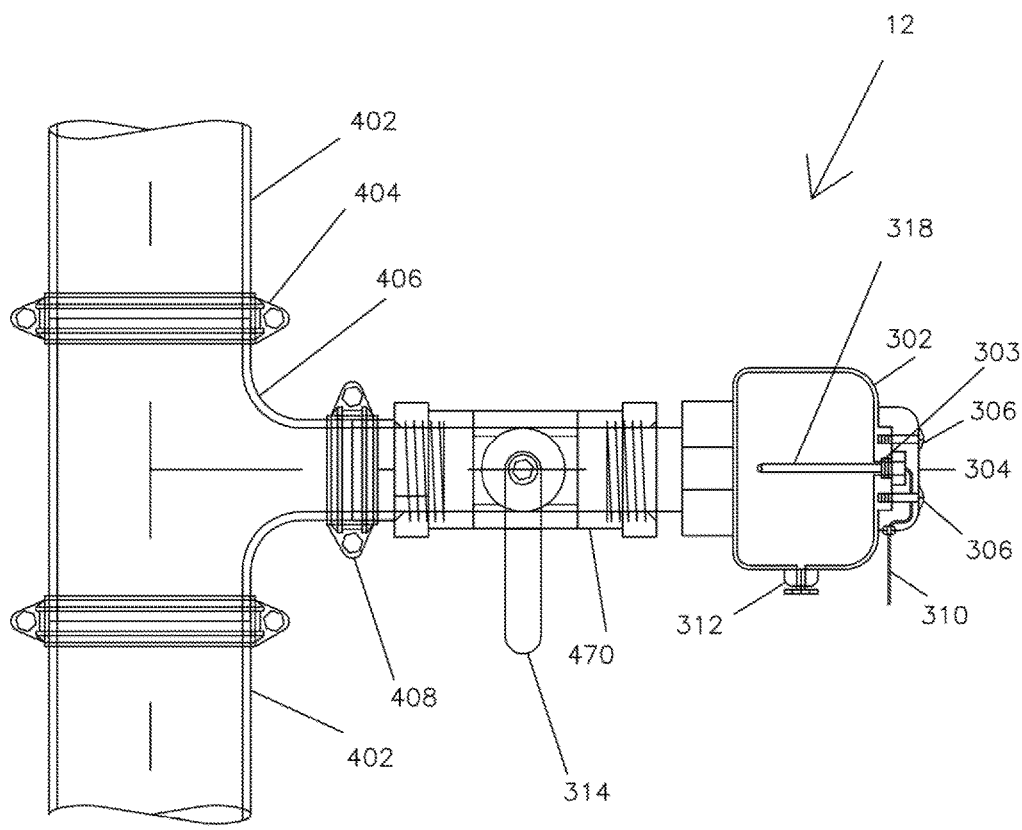
FIG. 8 is a side view of the fluid/gas sensor assembly reservoir with probe with an independent ball valve being attached to a tee fitting in a fluid/gas filled piped system, according to the present invention.
Figure 8A:
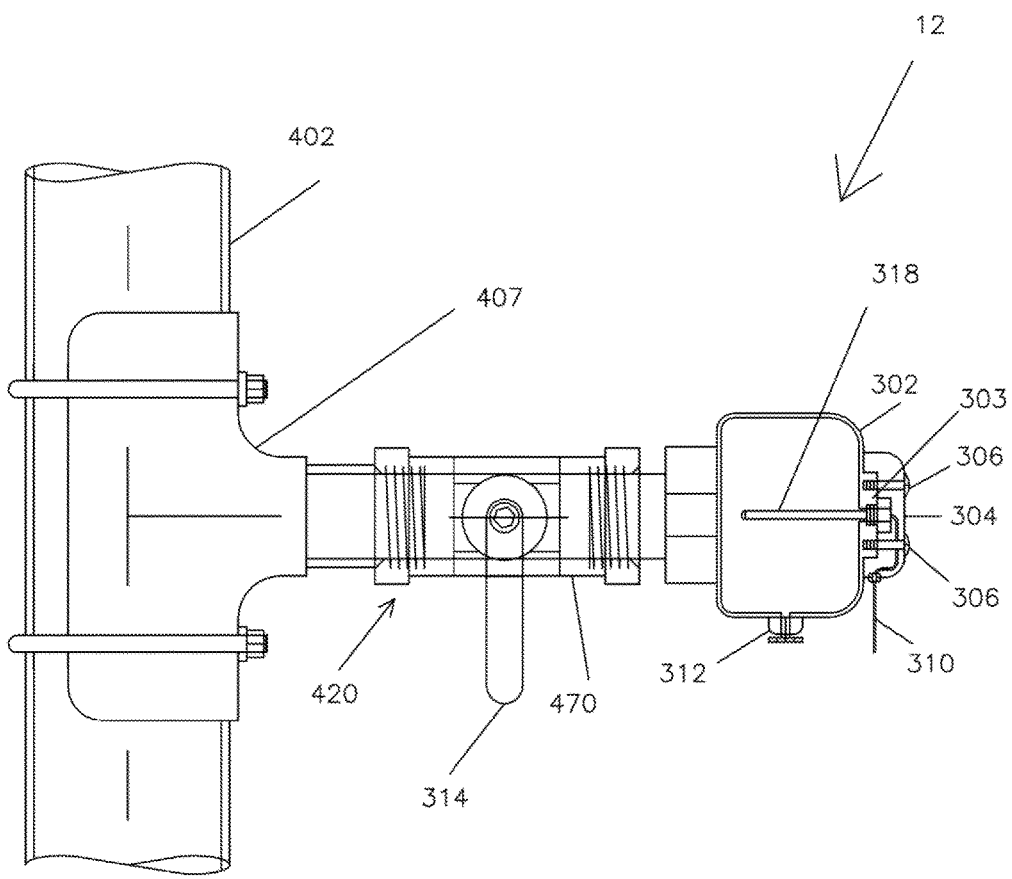
FIG. 8a is a side view of the fluid sensor reservoir with probe with an independent ball valve being attached to fluid filled pipe system by way of a typical wet-tap and saddle connection method.

With respect to FIGS. 8 and 8a, fluid/gas assembly 12 can be easily and quickly removed from pipe 402. In particular, ball valve 314 which is located on adapter 470 is operated so that any fluid/gas in pipe 402 is not allowed to enter into sensor reservoir 302. The drain/bleed valve 312 is then operated to drain any fluid/gas located within reservoir 302. Finally, fluid/gas assembly 12 is simply removed from coupling device 408 (FIG. 8) or conventional threaded connector 420 (FIG. 8a) by rotating fluid/gas assembly 12 so that fluid/gas assembly 12 is unscrewed from coupling device 408 (FIG. 8) or conventional threaded connector 420 (FIG. 8a). With respect to FIG. 8a, the same method and process is applicable in instances where a conventional saddle 407 is installed on pipe system 402 by way of a typical wet-tap and saddle connection method.

Figure 9:
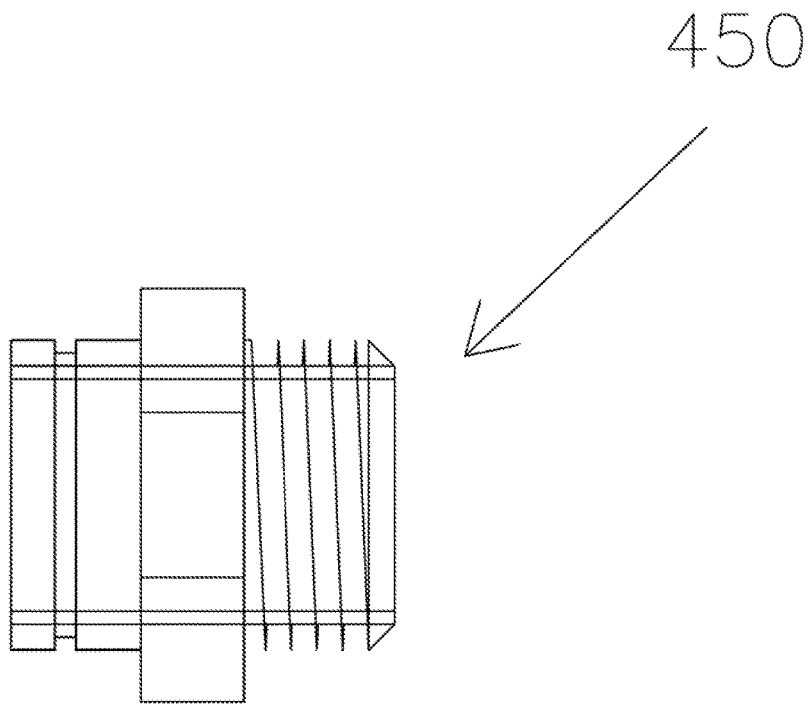
FIG. 9 is a schematic illustration of an adapter employing male Standard Pipe Thread (SPT) fittings and a Grooved Pipe fitting for use with the fluid sensor reservoir with probe with or without an integrated ball valve, constructed according to the present invention.
Figure 10:
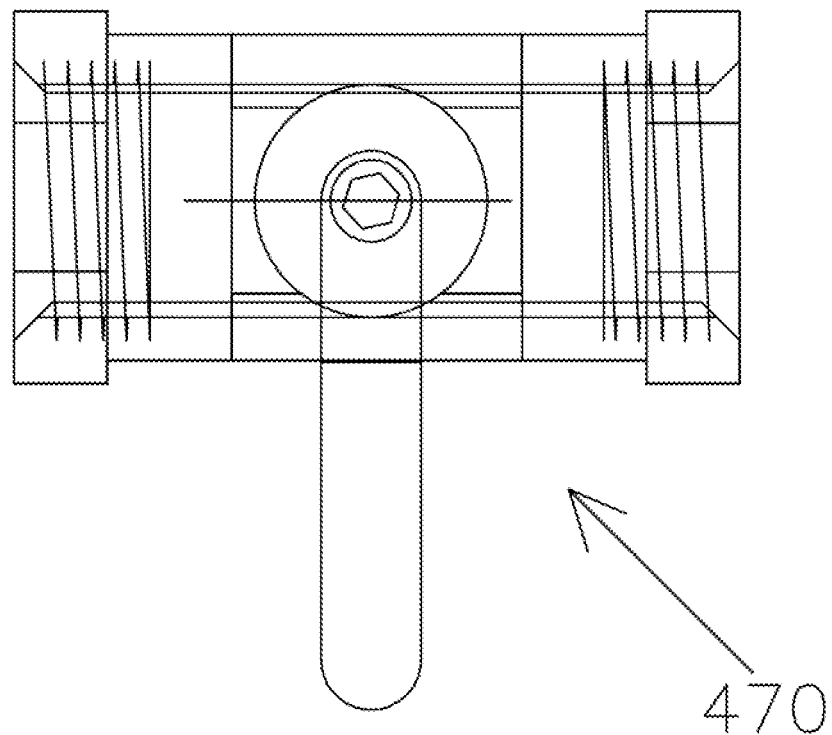
FIG. 10 is a schematic illustration of a ball valve adapter employing female Standard Pipe Thread (SPT) fittings on both ends for use with the fluid sensor reservoir with probe without an integrated ball valve, constructed according to the present invention.

With respect to FIGS. 9 and 10, the present invention may employ an independent adapter 450 (FIG. 9) and/or a ball valve or various other alternative types and combinations of adapters 470 (FIG. 10), valves and other devices capable of attaching the present invention to its desired location and use. It is to be understood that adapters 450 and 470, preferably, are constructed of any suitable durable, high strength, corrosion or rust-resistant material such as metal or plastic.

Materials and Methods

The present invention was used to obtain the temperature of standing liquid/gas inside a pipe. A model of the present invention was constructed. The process started by fabricating a self-contained pipe system using the following materials and components: standard 1½ inch black iron pipe open at the top and a ball valve at the bottom for the purpose of draining the system. Then, a standard tee fitting (three female standard pipe thread connections) was added to the system to contain the prototype, specifically, so as to not significantly alter the fluid dynamics of the system.

The North/South connection fittings were connected to the existing pipe system. The East connection was used to house the sensor reservoir with, sensor probe. A 3-wire digital waterproof thermal probe was attached that would be compatible with a display for reading purposes. The thermal probe was threaded in a metric standard, so several adapters were needed to make it fit into the tee of the existing system.

On the East connection, a standard A inch ball valve was installed between the tee and the connections to the thermal probe in order to allow control by the operator of the water flow to the probe. As discussed above, another reason for the inclusion of the ball valve between the system and the sensor was to easily be able to shut off the water flow to the thermal probe in order to replace sensors without needing to drain the fluid from the entire system.

The prototype embodying the concept of the present invention was a success and answered the unmet need experienced by many in the residential and commercial property management industry. The present invention allowed for the accurate and convenient measurement of the temperature of the water within the system 2. If the system was filled with very hot or very cold water and subsequently closed off, the thermal sensor accurately and consistently displayed the temperature of the liquid therein contained. As the temperature in the closed system gradually equalized to the ambient room temperature, those changes were reported, in real time, by the prototype of the present invention.

During the development and experimentation process, some limitations to the system were encountered. The system 2 was refined for ease of deployment and installation. Some of these changes include:

a.) Redesigning the reservoir 302 which housed the thermal probe 318 into a larger reservoir 302, so that the reservoir 302 was specifically designed to house one or many types of sensors 318 of varying sizes and lengths. This change also creates greater exposure of the sensor(s) 318 to a higher volume of fluid within the system, thereby increasing the accuracy of its sampling.

b.) The addition of an integrated system fitting 316, 316a, 316b with standard pipe fittings to the end of the reservoir 302 increased the versatility of the present invention and its putative performance in various real-world contexts and under myriad conditions, including: standard thread for pipe with female or male connections (FIGS. 5 and 6) and standard grooved pipe, specifically for life safety sprinkler systems.

c.) The addition of a pipe stub with an integrated ball valve 314 and a standard system fitting 316, 316a and 316b to accommodate the following connections: male and/or female standard pipe thread and standard grooved pipe, specifically in contemplation of use for life safety sprinkler systems.

d.) The addition of a drain/bleed valve 312 at the bottom of the sensor reservoir 302, was important for several reasons, as it greatly enhanced the preferred embodiment of the present invention. When the reservoir 302 is isolated from the system 2, the petcock or other drain/bleed valve 312 enables an operator to drain the reservoir 302 without draining or shutting down the entire system 2. It allows for a real-time sample of the liquid therein contained to be taken outside the system 2. Additionally, in a pressurized system, the drain/bleed valve serves as a pressure release when the reservoir 302 is isolated from the system 2 and the reservoir 302 or its sensors 318 need to be removed, replaced, or changed. Furthermore, as liquid flows into the reservoir 302 from the system, the drain/bleed valve 312 provides additional means to ensure that reservoir 302 is filling with the fluid from the rest of the system 2.

e.) The addition of a protective cap 304 over the rear of the sensor(s) 318 serves to protect the mechanisms of the various types of sensors from damage.

Examples of Use of the Present Invention

The present invention is more fully described by way of the following non-limiting examples. Modifications of these examples will be apparent to those skilled in the art.

One example of the utility of the present invention includes the monitoring of standing water in fire sprinkler system pipes, especially in the context of residential and commercial construction and property management.

A further example of the utility of the present invention relates to what are referred to as dry pipe sprinkler systems. These are deployed in locations which serve areas particularly vulnerable to freezing conditions (e.g., commercial freezers and parking garages). These systems use an air-lock to separate the water-filled portion of the system from the dry portion of the system. Unfortunately, air locks can become compromised, thereby enabling liquid to flow into the dry system where it may freeze and disable the system and/or its ability to function properly without notification. Adding a vertically-mounted tee 406 and sensor reservoir 302 with a moisture sensor in the dry pipe section of the system would serve as an early-warning indicator that the system has been compromised with water in advance of a freeze event, potentially saving lives, property, time and money.

The present invention may be used to monitor domestic water supplies in buildings, and residences that may or may not be periodically unoccupied.

The present invention is also capable of providing measurements of the temperature, pH, moisture levels, or other properties of fluid, relevant to the food, pharmaceutical or manufacturing industries or other applications.

An additional example of the present invention's usefulness is the reading of pH or other chemical indicators of a solution for applications and industries involving chemical engineering, chemistry, or biology.

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description. In the description, relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. Furthermore, the term fluid/gas are meant to be used interchangeably.

All patents, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety.

The applicant reserves the right to physically incorporate into this specification any and all materials and information from any such patents, publications, scientific articles, web sites, electronically available information, and other referenced materials or documents to the extent such incorporated materials and information are not inconsistent with the description herein.

The written description portion of this patent includes all claims. Furthermore, all claims, including all original claims as well as all claims from any and all priority documents, are hereby incorporated by reference in their entirety into the written description portion of the specification, and Applicant(s) reserve the right to physically incorporate into the written description or any other portion of the application, any and all such claims. Thus, for example, under no circumstances may the patent be interpreted as allegedly not providing a written description for a claim on the assertion that the precise wording of the claim is not set forth in haec verba in written description portion of the patent.

The claims will be interpreted according to law. However, and notwithstanding the alleged or perceived ease or difficulty of interpreting any claim or portion thereof, under no circumstances may any adjustment or amendment of a claim or any portion thereof during prosecution of the application or applications leading to this patent be interpreted as having forfeited any right to any and all equivalents thereof that do not form a part of the prior art.

All of the features disclosed in this specification may be combined in any combination. Thus, unless expressly stated otherwise, each feature disclosed is only an example of a generic series of equivalent or similar features.

It is to be understood that while the invention has been described in conjunction with the detailed description thereof, the foregoing description is intended to illustrate and not limit the scope of the invention, which is defined by the scope of the appended claims. Thus, from the foregoing, it will be appreciated that, although specific embodiments of the invention have been described herein for the purpose of illustration, various modifications may be made without deviating from the spirit and scope of the invention. Other aspects, advantages, and modifications are within the scope of the following claims and the present invention is not limited except as by the appended claims.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. Thus, for example, in each instance herein, in embodiments or examples of the present invention, the terms "comprising", "including", "containing", etc. are to be read expansively and without limitation. The methods and processes illustratively described herein suitably may be practiced in differing orders of steps, and that they are not necessarily restricted to the orders of steps indicated herein or in the claims.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by various embodiments and/or preferred embodiments and optional features, any and all modifications and variations of the concepts herein disclosed that may be resorted to by those skilled in the art are considered to be within the scope of this invention as defined by the appended claims.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

It is also to be understood that as used herein and in the appended claims, the singular forms "a," "an," and "the" include plural reference unless the context dearly dictates otherwise, the term "X and/or Y" means "X" or "Y" or both "X" and "Y", and the letter "s" following a noun designates both the plural and singular forms of that noun. In addition, where features or aspects of the invention are described in terms of Markush groups, it is intended and those skilled in the art will recognize, that the invention embraces and is also thereby described in terms of any individual member or subgroup of members of the Markush group.

Other embodiments are within the following claims. Therefore, the patent may not be interpreted to be limited to the specific examples or embodiments or methods specifically and/or expressly disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

Other modifications and implementations will occur to those skilled in the art without departing from the spirit and the scope of the invention as claimed. Accordingly, the description hereinabove is not intended to limit the invention, except as indicated in the appended claims.

Therefore, provided herein is a new and improved monitoring and control process system for fire sprinkler and other systems that utilizes sensors having a sensor assembly reservoir. The preferred monitoring and control process systems for fire sprinkler and other systems that utilize sensors in an integrated reservoir assembly, according to various embodiments of the present invention, offer the following advantages: ease of use; durability; improved fluid/gas conditions measurement; improved energy savings; ability to measure the temperature of the fluid without interrupting the flow of the fluid; ease of attachment of the sensor to the fluid piping; ability to measure other characteristics of the fluid in the piping system; and ease or removal/replacement of the sensor. In fact, in many of the preferred embodiments, these advantages of ease of use, durability, improved fluid temperature measurement, improved energy savings, ability to measure the temperature of the fluid without interrupting the flow of the fluid, ease of attachment of the sensor to the fluid piping, ability to measure other characteristics of the fluid in the piping system, and ease or removal/replacement of the sensor are optimized to an extent that is considerably higher than heretofore achieved in prior, known monitoring and control process systems for fire sprinkler and other systems.

We claim:

1. A system for monitoring and controlling temperature of a sprinkler system comprising:
    a sprinkler system being a piped system, wherein a fluid is located within the piped system such that the fluid creates a fluid flow dynamic within the piped system;
    a first fluid sensor having a reservoir and a temperature probe located within the reservoir, wherein the first fluid sensor is operatively connected to the piped system such that the first fluid sensor is capable of detecting a temperature of the fluid located within a particular section of the piped system and wherein the temperature probe is located within the reservoir such that the temperature probe does not disturb the fluid flow dynamic within the piped system;
    a controller operatively connected to the first fluid sensor for receiving the detected temperature of the fluid located within the particular section of the piped system; and
    a heating device operatively connected to the controller, wherein the controller activates the heating device if the detected temperature of the fluid located within the particular section of the piped system falls below a predetermined temperature.

2. The system for monitoring and controlling temperature of a sprinkler system, according to claim 1, wherein the first fluid sensor is further comprised of:
    a drain/bleed valve operatively connected to the reservoir.

3. The system for monitoring and controlling temperature of a sprinkler system, according to claim 1, wherein the first fluid sensor is further comprised of:
a ball valve operatively connected to the reservoir.

4. The system for monitoring and controlling temperature of a sprinkler system, according to claim 1, wherein the first fluid sensor is further comprised of:
an integrated system fitting operatively connected to the reservoir.

5. The system for monitoring and controlling temperature of a sprinkler system, according to claim 1, wherein the system is further comprised of:
a second fluid sensor operatively connected to the controller.

6. The system for monitoring and controlling temperature of a sprinkler system, according to claim 1, wherein the system is further comprised of:
an offsite display system operatively connected to the controller, wherein the controller transmits information related to the detected temperature of the fluid located within a particular section of the piped system to the offsite display system.

7. The system for monitoring and controlling temperature of a sprinkler system, according to claim 1, wherein the system is further comprised of:
an offsite fire monitoring control system operatively connected to the controller, wherein the controller transmits information related to the detected temperature of the fluid located within a particular section of the piped system to the offsite fire monitoring control system.

8. The system for monitoring and controlling temperature of a sprinkler system, according to claim 1, wherein the system is further comprised of:
an on-site alarm system operatively connected to the controller, wherein the controller transmits information related to the detected temperature of the fluid located within a particular section of the piped system to the on-site alarm module.

9. The system for monitoring and controlling temperature of a sprinkler system, according to claim 1, wherein the controller is further comprised of:
a battery backup; and
a battery recharge device operatively connected to the battery backup.

10. A system for monitoring and controlling temperature of a sprinkler system, comprising:
a sprinkler system being a piped system, wherein a fluid is located within the piped system such that the fluid creates a fluid flow dynamic within the plurality of pipes;
a first fluid sensor having a reservoir and a temperature probe located within the reservoir, wherein the first fluid sensor is operatively connected to the piped system such that the first fluid sensor is capable of detecting a temperature of the fluid located within a particular section of the piped system and wherein the temperature probe is located within the reservoir such that the temperature probe does not disturb the fluid flow dynamic within the piped system;
a second fluid sensor;
a controller operatively connected to the first fluid sensor and the second fluid sensor for receiving the detected temperature and other desired characteristics of the fluid located within the particular section of the piped system; and
a heating device operatively connected to the controller, wherein the controller activates the heating device if the detected temperature of the fluid located within the particular section of the piped system falls below a predetermined temperature.

11. The system for monitoring and controlling temperature of a sprinkler system, according to claim 10, wherein the first fluid sensor is further comprised of:
a drain/bleed valve operatively connected to the reservoir.

12. The system for monitoring and controlling temperature of a sprinkler system, according to claim 10, wherein the first fluid sensor is further comprised of:
a ball valve operatively connected to the reservoir.

13. The system for monitoring and controlling temperature of a sprinkler system, according to claim 10, wherein the first fluid sensor is further comprised of:
an integrated system fitting operatively connected to the reservoir.

14. The system for monitoring and controlling temperature of a sprinkler system, according to claim 10, wherein the system is further comprised of:
an offsite display system operatively connected to the controller, wherein the controller transmits information related to the detected temperature of the fluid located within a particular section of the piped system to the offsite display system.

15. The system for monitoring and controlling temperature of a sprinkler system, according to claim 10, wherein the system is further comprised of:
an offsite fire monitoring control system operatively connected to the controller, wherein the controller transmits information related to the detected temperature of the fluid located within a particular section of the piped system to the offsite fire monitoring control system.

16. The system for monitoring and controlling temperature of a sprinkler system, according to claim 10, wherein the system is further comprised of:
an on-site alarm system operatively connected to the controller, wherein the controller transmits information related to the detected temperature of the fluid located within a particular section of the piped system to the on-site alarm module.

17. The system for monitoring and controlling temperature of a sprinkler system, according to claim 10, wherein the controller is further comprised of:
a battery backup; and
a battery recharge device operatively connected to the battery backup.

18. A method of monitoring and controlling temperature of a sprinkler system, comprising the steps of:
providing a sprinkler system having a piped system, wherein a fluid is located within the piped system such that the fluid creates a fluid flow dynamic within the piped system;
providing a fluid sensor having a reservoir and a temperature probe located within the reservoir, wherein the first fluid sensor is operatively connected to the piped system such that the first fluid sensor is capable of detecting a temperature of the fluid located within a particular section of the piped system and wherein the temperature probe is located within the reservoir such that the temperature probe does not disturb the fluid flow dynamic within the piped system;
providing a controller operatively connected to the first fluid sensor for receiving the detected temperature of the fluid located within the particular section of the piped system; and providing a heating device operatively connected to the controller, wherein the controller activates the heating device if the detected temperature of the fluid located within the particular section of the piped system falls below a predetermined temperature.

19. The method for monitoring and controlling temperature of a sprinkler system, according to claim 18, wherein the step of providing a first fluid sensor is further comprised of the step of:

providing a drain/bleed valve operatively connected to the reservoir.

20. The method for monitoring and controlling temperature of a sprinkler system, according to claim 18, wherein the step of providing a controller is further comprised of the step of:

providing an offsite display system operatively connected to the controller, wherein the controller transmits information related to the detected temperature of the fluid located within a particular section of the piped system to the offsite display system.

* * * * *